US006937877B2

(12) United States Patent
Davenport

(10) Patent No.: US 6,937,877 B2
(45) Date of Patent: Aug. 30, 2005

(54) WIRELESS COMMUNICATION WITH A MOBILE ASSET EMPLOYING DYNAMIC CONFIGURATION OF A SOFTWARE DEFINED RADIO

(75) Inventor: David Michael Davenport, Niskayuna, NY (US)

(73) Assignee: General Electric Company, Erie, PA (US)

( * ) Notice: Subject to any disclaimer, the term of this patent is extended or adjusted under 35 U.S.C. 154(b) by 63 days.

(21) Appl. No.: 09/742,725

(22) Filed: Dec. 21, 2000

(65) Prior Publication Data

US 2002/0082044 A1 Jun. 27, 2002

(51) Int. Cl.[7] .................................................. H04Q 7/20
(52) U.S. Cl. ............................... 455/552.1; 455/414.2; 455/419; 455/456.3; 455/456.6; 455/432.1; 370/329; 379/93.52
(58) Field of Search .......................... 455/414.1, 414.2, 455/418, 419, 456.3, 456.6, 552.1, 556.1, 67.11, 433, 432.1

(56) References Cited

U.S. PATENT DOCUMENTS

| | | | |
|---|---|---|---|
| 5,758,332 A | * | 5/1998 | Hirotani .......................... 707/1 |
| 5,819,180 A | * | 10/1998 | Alperovich et al. .......... 455/465 |
| 6,052,600 A | | 4/2000 | Fette et al. |
| 6,169,897 B1 | * | 1/2001 | Kariya ...................... 455/456.3 |
| 6,181,935 B1 | * | 1/2001 | Gossman et al. ............. 455/433 |
| 6,351,638 B1 | * | 2/2002 | Robinson .................... 455/418 |
| 6,549,768 B1 | * | 4/2003 | Fraccaroli ................. 455/456.3 |
| 6,571,082 B1 | * | 5/2003 | Rahman et al. ........... 455/67.11 |
| 6,615,038 B1 | * | 9/2003 | Moles et al. ................. 455/418 |

OTHER PUBLICATIONS

J. Mitola, III; Software Radios Survey, Critical Evaluation and Future Directions; IEEE AES Systems Magazine; Apr., 1993; pp. 25–36.
Joe Mitola; The Software Radio Architecture; IEEE Communications Magazine; May, 1995; pp. 26–38.
C. Noblet, A.H. Aghvami; Assessing The Over–The–Air Software Download For Reconfigurable Terminal; 1998 The Institution of Electrical Engineers; pp. 1–6.
Pentti Leppänen, Jaakko Reinilä, Aska Nykänen, Visa Tapio, Matti Isohookana, Juha Phytilä, Timo Kokkonen, and Jari Sillanpää; Software Radio–An Alternative for the Future in Wireless Personal and Multimedia Communications; 1999 IEEE; pp. 364–368.

(Continued)

Primary Examiner—Edward F. Urban
Assistant Examiner—Huy Phan
(74) Attorney, Agent, or Firm—Carl A. Rowold, Esq.; Terry M. Sanks, Esq.; Beusse Brownlee Wolter Mora & Maire, P.A.

(57) ABSTRACT

A system for communicating over a plurality of wireless data networks, the system comprising a software defined radio capable of being configured to operate with a plurality of wireless network services; a radio controller for reconfiguring the radio to operate over a wireless data network; a first database containing information about wireless data networks; wireless location technology used to determine a location of the radio; wherein the wireless location technology determines a location of the radio and the controller compares the location with information contained in the first database to determine available wireless data networks.

30 Claims, 2 Drawing Sheets

OTHER PUBLICATIONS

Joseph Mitola, III; Software Radio Architecture: A Mathematical Perspective; Apr., 1999 IEEE Journal On Selected Areas In Communications, vol. 17, No. 4; pp. 514–538.

Walter H. W. Tuttlebee; Software–Defined Radio: Facets of a Developing Technology; IEEE Personal Communications, Apr., 1999; pp. 38–44.

Srikathyayani Srikanteswara, Jeffrey H. Reed, Peter Athanas, and Robert Boyle; A Soft Radio Architecture for Reconfigurable Platforms; IEEE Communications Magazine, Feb., 2000; pp. 140–147.

Hiroaki Koshima and Joseph Hoshen; Personal locator services emerge; IEEE Spectrum; Feb., 2000; pp. 41–48.

K. Moessner, R. Tafazolli; Terminal Reconfigureability—The Software Download Aspect; 3G Mobile Communication Technologies, Conference Publication N. 471, IEE 2000; pp. 326–330.

Enrico Buracchini; The Software Radio Concept; IEEE Communications Magazine, Sep., 2000; pp. 138–143.

Srikathyayani Srikanteswara, Michael Hosemann, Jeffrey Reed, and Peter M. Athanas; Design and Implementation of a Completely Reconfigurable Soft Radio; 5 pgs.

* cited by examiner

WIRELESS COMMUNICATION WITH A MOBILE ASSET EMPLOYING DYNAMIC CONFIGURATION OF A SOFTWARE DEFINED RADIO

BACKGROUND OF THE INVENTION

This invention relates to wireless communications, and more specifically to using a single radio to communicate from a remote mobile asset as it passes through a plurality of wireless data networks.

Existing wide area network, that is to say cellular, radios are usually designed and configured to operate with a specific wireless data network. Thus, when a user travels outside of the coverage area of its chosen wireless data network, its radio ceases to function. Some wireless data networks have established cooperative roaming agreements which allow a travelling user with a compatible radio design to operate on a second, foreign wireless data network. Roaming agreements help to alleviate coverage limitations but cannot provide for seamless, global operation due to the existence of wireless data network incompatibilities. Current wide area wireless voice and data networks communicate using different technologies, such as Code Division Multiple Access (CDMA), Time Division Multiple Access (TDMA), Global System for Mobilization (GSM), Cellular Digital Packet Data (CDPD), DataTac, Mobitex, and General Packet Radios Service (GPRS). The utilization of various frequency bands also segregates wireless networks. While portable radio devices have emerged offering operation on multiple frequency bands, few commercial devices have been realized offering multiple communication modes based upon the different technologies listed above. Thus, when a user enters a region serviced by a non-compatible wireless data network, the user may need to either rent or purchase a radio that is compatible with that region's local network.

A mobile asset, like an individual, may also travel outside of its selected wireless data network. However, it may not be physically or economically possible to install a new, compatible radio device in a mobile asset such as a truck or locomotive. Furthermore, some mobile assets such as railcars, trailers and containers, are typically unattended while in transit. Mobile remote assets would benefit from a suite of radios employing different radio communication technology and, thus, affording communication redundancy in the event that any single radio is outside of its network coverage region. A remote asset with such a suite of differing radios would also benefit from the ability to select that radio and associated wireless data network with appropriate data transfer characteristics (speed, latency) and lowest service costs for the exchange of data. The cost of a redundant radio suite typically prohibits its utility as it includes the parallel hardware as well as recurring service costs associated with the underlying wireless data networks.

A fleet of mobile remote assets would benefit from a radio that is configured to allow each individual mobile asset to communicate with a central service facility regardless of where each respective mobile asset is located and regardless of which wireless data network is available for each respective geographic location.

To address these problems, software defined radio technology is being developed. Software defined radio is an emerging technology, thought to build flexible radio systems with multi-serviced, multi-standard, multi-band operation via re-configurable and re-programmable software instructions. The flexibility of a software defined radio derives from the ability to operate in a multi-serviced environment without being constrained to a particular standard but able to offer, in theory, services in an already standardized or future system, on any radio frequency band. It is believed that U.S. Pat. No. 6,052,600 discloses a software defined radio which must communicate with a base station to receive valid operation licenses and appropriate software configuration instructions in order for the radio to communicate over a plurality of wireless data networks. However, if a system is unable to obtain this information from a base station prior to losing a current wireless data network connection, the radio is not able to dynamically select a new software configuration and wireless data network without directions from the base station.

SUMMARY OF THE INVENTION

Towards this end, a fleet of mobile assets would benefit from a software defined radio that is able to dynamically determine available wireless data networks and configure its software to operate over these networks. A fleet of mobile remote assets would also benefit from a system which emphasizes least cost routing, or in other words, the ability to select from many available data links where the radio could select the lowest cost network regardless of the type of wireless network. Furthermore, a fleet would also benefit from improved reliability if a radio can switch between wireless networks that overlap a given geographic region regardless of the type of wireless networks available to communicate over the clearest network.

Thus, fleets of mobile remote assets would benefit from a method and a system for a programmable software radio to communicate over a plurality of wireless data networks with a central service facility, the method comprising providing the radio with wireless location technology, providing the radio with data about wireless data networks, determining a location of the radio with wireless location technology, comparing the location of the radio with data about wireless data networks, determining available wireless data networks based on the location of the radio, selecting a wireless data network, configuring the radio to communicate over the selected wireless data network.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
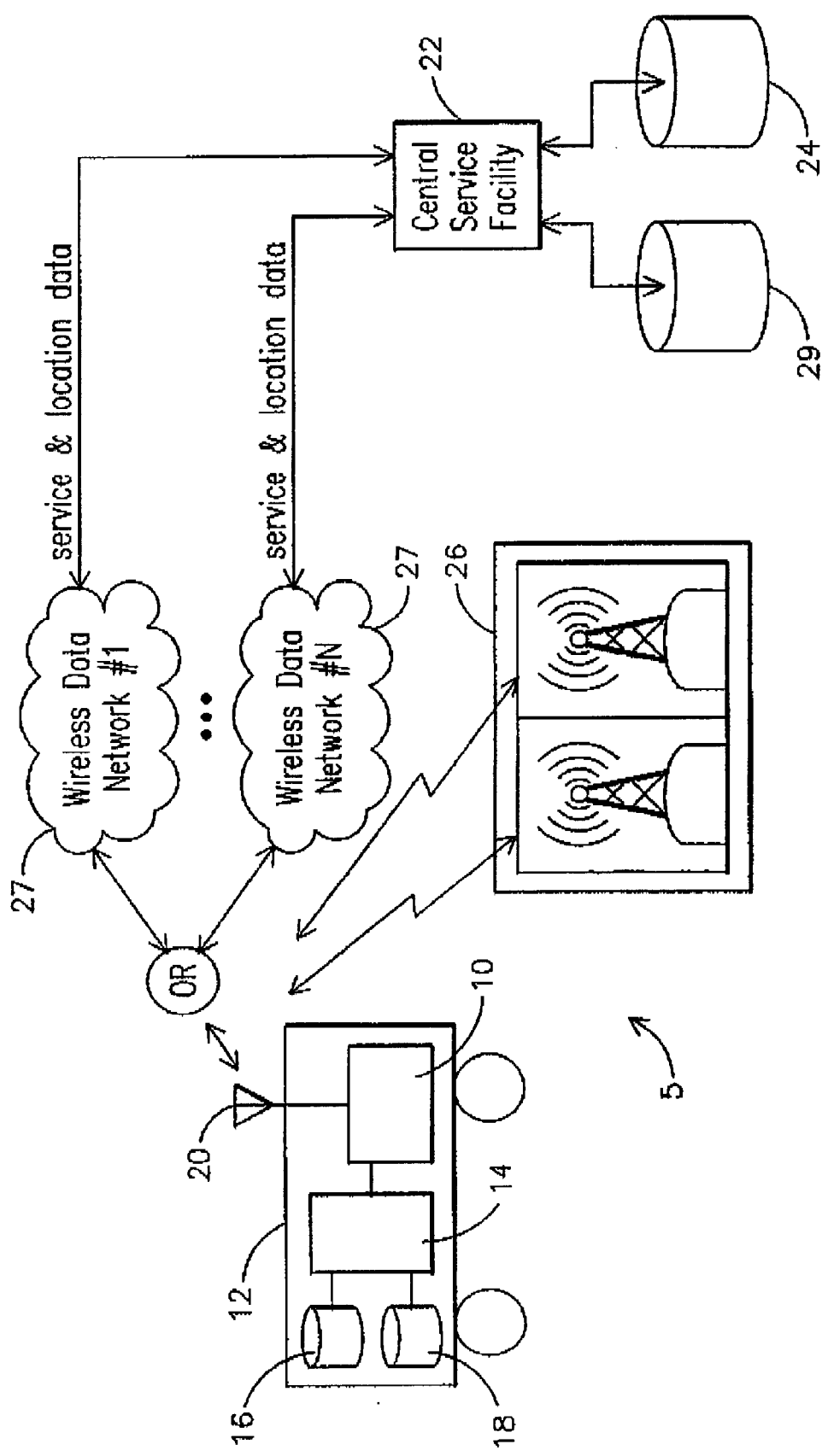
FIG. 1 is a block diagram illustration of the components used in the present invention.

FIG. 1 is a block diagram illustration of the components used in the present invention. A software defined radio 10 resides on a remote mobile asset 12, such as train, bus or truck. The remote asset 12 could be one asset in a fleet of mobile remote assets. The radio 10 is part of a system 5 that comprises the radio 10 connected to a radio controller 14, a database 16 containing information about wireless networks 27, and a second database 18 containing data about preselected radio and television broadcast channels 26. The first database 16, which contains wireless network information, includes such network information as coverage area, data transfer capability and service activation/authorization. Radio controller 14 contains software configuration parameters (i.e. network profiles) used to configure the software radio 10 in order to communicate with each respective wireless network contained in the first database 16.

The second database 18 contains pre-selected broadcast media frequencies for known channels 26. Broadcast media includes television and radio. The second database contains television channels broadcast over either Ultra-High Frequency (UHF) or Very High Frequency (VHF) bandwidths. As for radio frequencies, this includes radio channels that broadcast of either Amplitude Modulation (AM) and Frequency Modulation bandwidths. The data or information contained in this database 18 include, but is not limited to, commercial broadcast licenses and operation geographic regions.

The remote asset 12 also has an antenna 20 for transmitting and receiving information over a wireless network from a central service facility 22. The central service facility 22 also maintains a wireless data network database 24 and a broadcast media database 29. In one embodiment, the central service facility's wireless data network data bases 24 and 29 are master databases where the wireless network databases 16 and 18 residing on the remote asset 12 are subsets of the central service facility's database 24 and 29, respectively. In operation, the central service facility 22 can send updates from its wireless network database 24 to the remote asset's wireless network database 16 and/or from its broadcast media database 29 to the remote asset's broadcast media database 18.

Figure 2:
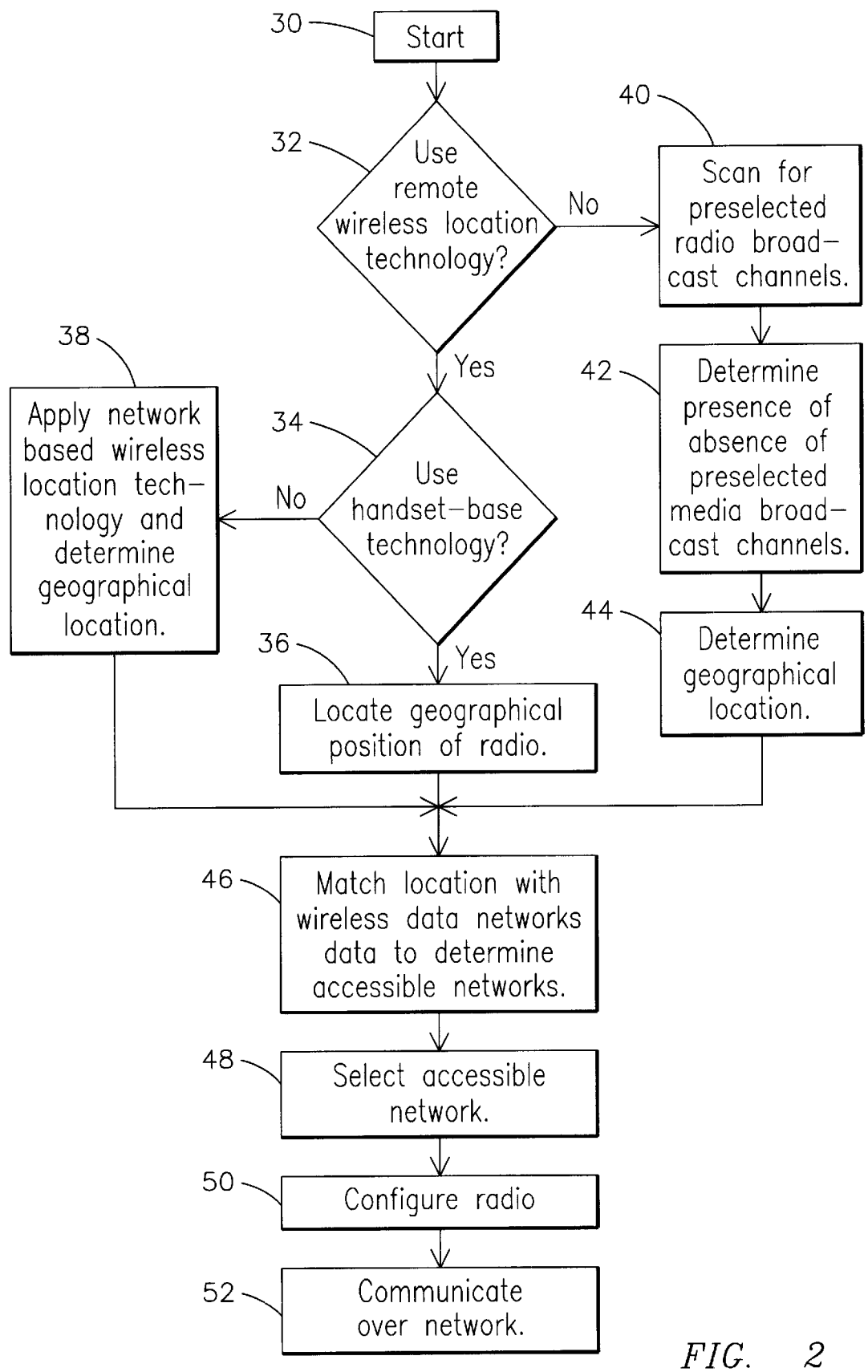
FIG. 2 is a block diagram of the steps taken by the present invention.

In operation, as disclosed in FIG. 2, when the remote asset 12 must begin, step 30, by selecting an available wireless network 27 in the remote asset's geographic region, a decision, step 32, must first be made about which type of wireless location technology to use to determine a location of the remote asset 12. Either remote wireless location technology or wireless location technology dedicated to the radio can be used. If the decision is made to use remote wireless location technology, the next step, step 34, is to determine which remote wireless technology to use. Specifically, the decision, step 34, consists of determining which type of remote wireless location technology to use. Remote wireless technology is technology which requires external location estimation systems to assist in determining a given location. One example of remote wireless location technology to use is integrated into the radio 10, and is referred to as handset-based wireless location technology. Examples of this type of wireless location technology include, but are not limited to Global Positioning System (GPS), assisted GPS, differential GPS or Enhanced Observed Time Difference (E-OTD). A second example of remote wireless location technology involves using a network-based wireless location technology. Such technology includes, but is not limited, Cell Identification with Timing Advance (CI+TA), Angle of Arrival (AOA), Uplink Time of Flight (UL-TOF), or multi-path fingerprinting. The network-based wireless technology is generally available from individual service providers offering wireless data network connections.

In one embodiment, a decision, step 34, is made whether to use handset-based wireless location technology. In another embodiment, this decision could involve determining whether to use network-based wireless location technology. If the decision is to use handset-based technology, the next step, step 36, is to locate a geographical position of the radio system 5 or remote asset 12 using the handset-based technology. If the decision is to use network-based technology, the next step, step 38, is to apply this technology and locate a geographical position of the radio system 5 or remote asset 12.

If the decision, step 32, is not to use remote wireless location technology, another locating option, steps 40, 42, 44, is incorporated into the system 5. This option involves, step 40, the radio controller 14 configuring the software radio 10 as a broadcast television and/or radio receiver using antenna 20, or a frequency scanning device, and initiating a scan to detect pre-selected media broadcast channels over the airwaves at the location of the remote asset 12. The scan, step 42, can either determine the presence or absence of pre-selected media broadcast channels 26. The resulting vector of the broadcast channel scan is then matched with the media database 18 to evaluate broadcast licenses and operation to coarse geographic regions to determine the location of the mobile asset 12, step 44. Thus, the software defined radio 10 is configured to scan commercial broadcast television and radio frequency bands to identify those frequency channels (i.e. stations) carrying broadcast signals in the vicinity. This knowledge is compared with the second database 18 containing information related to the license, frequency allocation and geographic location of commercial broadcast television and radio station operation. Comparison with this second database 18 allows the mobile asset 12 to determine its approximate position and then select a wireless data network 27 providing coverage in the vicinity.

Under either approach, using handset-based location technology, steps 34, 36, using network-based location technology, steps 38, or using media broadcast channels to determine location, steps 40, 42, 44, the next step, step 46, is to match the estimated mobile asset location information against the wireless data network database 16 to determine those wireless data networks providing coverage at that geographic location. The next step, step 48, is to select an accessible wireless data network 27. In one embodiment, the selection is based on which network licenses are owned by the fleet. Once selected and configured by the radio controller 14, step 50, the radio 10 can now communicate over the selected wireless data network, step 52. In another embodiment, the selection of a network 27 is based on the most cost effective network available.

In operation, if a network is selected but the communication connection is not reliable, or in other words the communication network is not clear because of noise or other propagation channel impairment, the radio 10, though the radio controller 14, can dynamically select another network 27 by using media broadcast channels to determine its location, steps 40, 42, 44, 46 and select a clearer network, or by using one of the remote wireless location technology approaches to select a clearer network. In another embodiment, after matching its location with the wireless database to determine accessible networks, step 46, the radio 10 can sample all available networks to determine the clearest communication network 27 available for communication.

The decision about which wireless location technology to use may be made either by a user or may be preprogrammed into the remote asset 12. For example, a pre-sent command directing which technology to use may be sent from the central service facility 22 to the remote asset 12, specifically, to the radio controller 14, commanding a temporal or spatial trigger for initiation of the wireless network selection process. Such a command from the central service facility 22 to the remote asset 12 may also specify which wireless location technology is to be employed. In another embodiment, a user located on the remote asset 12, can make the determination into which wireless location technology to use. In another embodiment, the radio system 5 can autonomously select the technology or apply a plurality of technologies.

While the invention has been described by what is presently considered to be the preferred embodiment, many variations and modifications will become apparent to those skilled in the art. Accordingly, it is intended that the invention not be limited to the specific illustrative embodiment but be interpreted within the fall spirit and scope of the appended claims.

What is claimed is:

1. A method for a programmable software radio to communicate over a plurality of wireless data networks with a central service facility, the method comprising:

providing the radio with wireless location technology;

providing the radio with data about wireless data networks;

providing the radio with data about pre-selected broadcast media channels;

scanning for pre-selected broadcast media channels to determine a location of the radio;

comparing the location of the radio with data about wireless data networks;

determining available wireless data networks based on the location of the radio;

selecting a wireless data network; and configuring the radio to communicate over the selected wireless data network.

2. The method of claim 1 wherein the step of providing the radio with data about wireless data networks comprises providing data about coverage area, license agreements, and radio software configuration data.

3. The method of claim 1, wherein the step of providing the radio with wireless location technology comprises providing the radio with handset-based wireless location technology.

4. The method of claim 1 wherein the step of providing the radio with wireless location technology comprises providing the radio with network-based wireless location technology.

5. The method of claim 1 wherein the step of scanning for pre-selected broadcast media channels further comprises scanning for pre-selected broadcast media channels based on broadcast media channels data provided to the radio to determine a location.

6. The method of claim 1 wherein the step of providing the radio with data about media broadcast channels comprises providing data about frequencies, coverage areas and license information.

7. The method of claim 1, wherein the step of determining a location of the radio with wireless location technology further comprises allowing the central service facility to determine a wireless location technology to use.

8. The method of claim 1, wherein the step of providing the radio with data about wireless data networks further comprises transmitting data updates from the central service facility to the radio.

9. A system for communicating over a plurality of wireless data networks, the system comprising:

a software defined radio capable of being configured to operate with a plurality of wireless network services;

a radio controller for reconfiguring the radio to operate over a wireless data network;

a first database containing information about wireless data networks;

wireless location technology used to determine a location of the radio;

a frequency scanning device;

a second database containing information about a predetermined set of media broadcast channels;

wherein the wireless location technology determines a location of the radio and the controller compares the location with information contained in the first database to determine available wireless data networks; and wherein the system uses the frequency scanning device to scan for media broadcast channels and compares results of the scan with information contained in the second database to determine a location of the radio.

10. The system of claim 9 wherein the information contained in the first database comprises coverage areas, license agreements, and radio software configuration information.

11. The system of claim 9 wherein the information contained in the second database comprises license and geographic operation information of the media broadcast channels.

12. The system of claim 9 wherein the predetermined media broadcast channels in the first database comprise information about radio broadcast channels.

13. The system of claim 11 wherein the predetermined media broadcast channels in the first database comprise information about television broadcast channels.

14. The system of claim 9 wherein the wireless location technology comprises handset-based wireless location technology.

15. The system of claim 9 wherein the wireless location technology comprises network-based wireless location technology.

16. The system of claim 9 wherein the radio controller selects a wireless location technology to determine a location of the radio.

17. The system of claim 9 further comprising a central service facility and a transceiver at the central service facility.

18. The system of claim 17 wherein the central service facility selects a wireless location technology to determine a location of the radio and transmits a command to the radio to use the selected location technology.

19. The system of claim 17 wherein the central service facility farther comprises a third database containing information about wireless data networks wherein the first database is a subset of the third database.

20. The system of claim 19 wherein the central service facility transmits a command to the radio to accept updates about wireless data networks from the third database to the first database.

21. The system of claim 9 wherein a user of the radio selects a location technology to determine a location of the radio.

22. The system of claim 9 wherein the system uses information contained in the first database to determine the most cost effective wireless data network.

23. The system of claim 9 wherein the system selects a reliable wireless data network.

24. A method for configuring a radio located on a remote mobile asset for communicating over a wireless network, the method comprising the steps of:

connecting the radio with a first database containing license and geographic operation information for a predetermined set of media broadcast channel frequencies;

connecting the radio with a second database containing information about wireless data networks;

scanning the media broadcast frequency bands to detect the predetermined set of media channels;

determining a location of the remote asset using results from detecting the predetermined set of media channels and comparing with license and geographic operation information contained in the first database;

comparing the location of the remote asset with information contained in the second database for determining available wireless data networks providing coverage at the location;

selecting a wireless data network providing coverage at the location;

configuring the radio for communicating over the wireless data network selected.

25. The method of claim 24 further comprising the remote asset communicating with a central service facility over the selected wireless data network.

26. The method of claim 25 further comprising transmitting data from the central service facility to the first database.

27. The method of claim 25 further comprising transmitting data from the central service facility to the second database.

28. The method of claim 24 wherein scanning to detect the media broadcast channels further comprises scanning to detect radio and television channels.

29. The method of claim 24 wherein selecting a wireless data network further comprises selecting a reliable wireless data network from available networks.

30. The method of claim 24 wherein selecting a wireless data network further comprises selecting a coat effective wireless data network from available networks.

* * * * *